Patented June 16, 1953

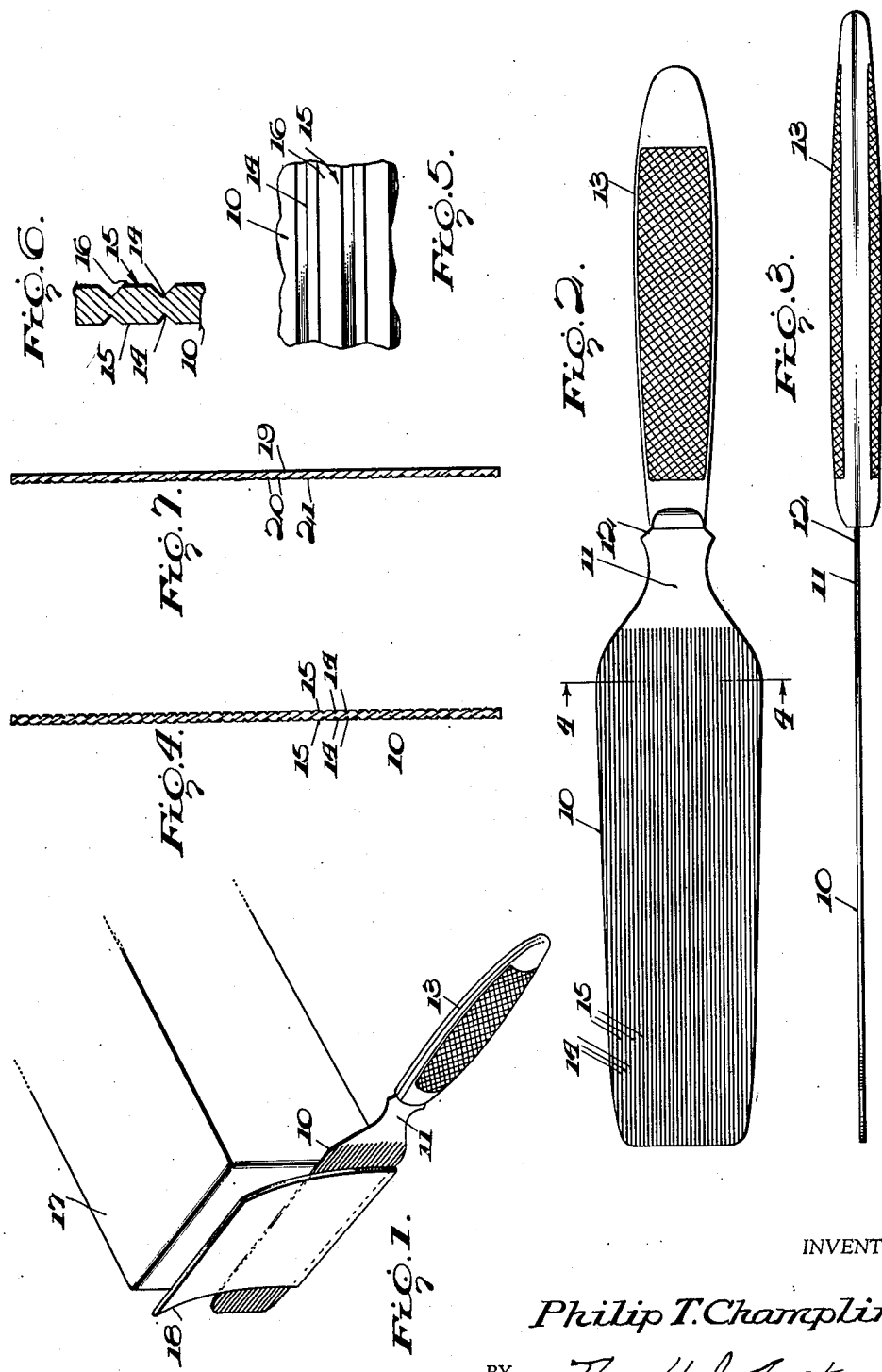

2,641,832

UNITED STATES PATENT OFFICE 2,641,832

CHEESE AND BUTTER KNIFE

Philip T. Champlin, Little Valley, N. Y.

Application December 13, 1951, Serial No. 261,536

1 Claim. (Cl. 30—115)

This invention relates to an improved cheese and butter knife, although, as will later appear herein, the device is well adapted for many other uses, such as cutting margarin and the like.

As will be appreciated by perhaps all who have had the experience, one of the most annoying difficulties, when cutting cheese with a conventional knife having the usual flat and smooth side faces, arises through the fact that the slice or portion of cheese cut sticks to the knife. Thus, after the slice has been cut, it is usually necessary to forcibly dislodge the slice from the knife, an operation which often breaks the slice, or, with some cheeses, crumbles the portion cut. Moreover, the slice of cheese being cut not only sticks to the knife at one side thereof, but also, the mold of cheese, or wedge thereof, as the case may be, sticks to the knife at its other side, thus sometimes rendering it difficult to force the knife downwardly through the cheese.

It is therefore an object of the present invention to provide a knife having such structural characteristics that, when cutting butter, cheese, or the like, the slice being cut will not stick to the knife.

Another object is to provide a knife wherein the block of cheese from which a slice is being cut will not stick to the knife, to thus facilitate the cutting of the slice.

And the invention seeks, as a still further object, to provide a knife which will be attractive in appearance, simple in structure, and convenient in use.

Other and incidental objects will appear during the course of the following description of the invention, and in the drawings:

Figure 1 is a perspective view showing the use of my improved knife to cut a slice from a block of cream cheese.

Figure 2 is a full scale side elevation of the knife.

Figure 3 is an edge elevation.

Figure 4 is a transverse section on the line 4—4 of Figure 2.

Figure 5 is a greatly enlarged detail elevation showing the flutes of the knife blade.

Figure 6 is a greatly enlarged detail section showing the flutes.

Figure 7 is a transverse section similar to Figure 4 but showing a slight variation of the invention.

In carrying the invention into effect, I employ an oblong, spatulate blade 10 of suitable resilient metal. Preferably, the blade is tapered in width toward its forward end, which latter is square and provided with rounded corners.

At its rear end portion, the blade 10 is curved inwardly at its side edges to provide a reduced neck 11 of cross sectional bell shape, which neck terminates in a crown 12, and extending from said crown axially of the blade is an appropriate handle 13 preferably fixed to a suitable tang integral with the crown. The neck 11 imparts flexibility to the blade 10 as a whole in a plane at a right angle to said blade. However, as will be appreciated, the blade is stiff and rigid edgewise thereof.

Formed in each side face of the blade 10 is a series of closely spaced horizontal flutes 14. As shown in Figure 5 of the drawings, these flutes are parallel to each other, while, as brought out in Figure 2, said flutes are also parallel to the longitudinal axis of the blade. Furthermore, as shown in Figure 6, the flutes 14 are preferably V-shaped in cross section, and the flutes at one side of the blade lie directly opposite to the flutes at the other side of the blade.

Defined between the flutes 14 at each side of the blade is a series of intermediate beads 15. Thus, as the side faces of the blade before the flutes were formed were originally flat and smooth, each bead is, as best brought out in Figures 5 and 6 of the drawings, provided with a flat, smooth crown 16, while the flat side walls of the bead, being formed by the flutes at opposite sides of said bead, diverge laterally from said crown.

In practice, the blade 10 is preferably thin, say one-sixteenth of an inch more or less. Accordingly, the flutes 14 are proportionately shallow, and best results have been obtained by spacing said flutes at the rate of thirty to thirty-two flutes to the inch. Thus, also, the crowns 16 of the beads 15 are narrow.

In use, the handle 13 of the knife is grasped by one hand in the usual manner, when, for instance, the blade 10 is positioned against the upper surface of a block of cheese, as conventionally shown in Figure 1 at 17, and, if so desired, the fingers of the other hand may then be placed against the upper edge of the blade near the tip thereof so that the two hands of the operator may exert a straight downward push upon the blade. Thus, as the blade is pushed vertically downward, a slice 18 of cheese will be cut from the block.

It is now to be noted that during the cutting operation, contact between the blade 10 and the cheese occurs almost exclusively at the narrow spaced crowns 16 of the beads 15, while the flutes 14 provide channels admitting air between the beads to the overlying surfaces of the cheese.

Sticking of the cheese to the blade, either the slice of cheese or the block thereof, is thus prevented. Accordingly, the cutting operation is thus not only rendered easier, but also, and most important, the slice of cheese is free when cut and does not stick to the blade.

In this connection, it is desired to emphasize that, as previously noted, the blade 10 of the knife is pushed straight down through the cheese to effect the cutting operation. It has been found that any pushing or pulling of the blade tends to clog the flutes 14 and impair their function as air pockets and air channels, with resultant tendency of the cheese to stick to the blade. Also, for this reason, flutes or ribs running transversely or obliquely of the blade will not serve the purpose, as such flutes, or the channels between such ribs, tend to immediately clog with cheese as the cutting operation progresses, with the result that substantially unbroken or uninterrupted contact between the cheese and blade is formed and the cheese sticks to the blade.

In Fig. 7 of the drawings, I have shown a slight variation of the invention wherein the blade 19 of the knife is provided at only one side face thereof with longitudinal flutes 20 and intermediate beads 21 corresponding to the flutes 14 and beads 15 previously described, the other side face of the blade being flat and smooth. Otherwise, the variation conforms to the structure first described.

Having thus described my invention, I claim:

A cheese and butter knife including a flexible, thin and flat, oblong blade of uniform thickness and provided with square longitudinal edges converging slightly from a point near the rear end of the blade toward the forward end of said blade and curving rearwardly toward each other from said point to define a narrow flexible neck at the rear end of the blade, and a handle fixed to said neck to extend axially of the blade and having flexible junction with the blade provided by said neck, one side face of the blade being formed with a multiplicity of closely spaced, shallow, V-shaped flutes extending parallel to each other as well as parallel to the longitudinal axis of the blade and defining between the flutes a multiplicity of parallel beads having flat, narrow crowns all lying in a single plane common thereto, the flutes and beads covering the entire area of said side face of the blade and both longitudinal edges of the blade being adapted to selectively cut through the substance to be sliced when the blade is forced transversely of said beads and flutes through said substance.

PHILIP T. CHAMPLIN.

References Cited in the file of this patent

UNITED STATES PATENTS

| Number | Name | Date |
|---|---|---|
| 427,961 | Blacke | May 13, 1890 |
| 592,961 | Brooks | Nov. 2, 1897 |
| 1,489,419 | Beechlyn | Apr. 8, 1924 |